United States Patent [19]
Joslin et al.

[11] 3,878,967
[45] Apr. 22, 1975

[54] MEDICAMENT DISPENSER

[75] Inventors: Joel A. Joslin, Crestwood; John C. Vogler, Manchester, both of Mo.

[73] Assignee: Sherwood Medical Industries, Inc., St. Louis, Mo.

[22] Filed: Apr. 3, 1974

[21] Appl. No.: 457,679

[52] U.S. Cl. .................. 221/88; 221/123; 221/135; 221/225; 221/236; 221/253; 221/290
[51] Int. Cl. ............................................ G07f 11/00
[58] Field of Search ....... 221/92, 69, 123, 133, 135, 221/224, 225, 236, 253, 254, 290, 88, 89, 127, 87, 88, 103

[56] References Cited
UNITED STATES PATENTS

| | | | |
|---|---|---|---|
| 2,473,054 | 6/1949 | Donaldson et al. | 221/253 X |
| 2,735,579 | 2/1956 | Wynn et al. | 221/123 |
| 2,901,964 | 9/1959 | Johnson | 221/92 X |
| 3,819,087 | 6/1974 | Schuller | 221/133 |

*Primary Examiner*—Allen N. Knowles
*Attorney, Agent, or Firm*—Stanley N. Garber; William R. O'Meara

[57] ABSTRACT

A medicament dispenser having a plurality of inclined bins each holding a plurality of cylindrical carriers having a medicament container, such as a hypodermic syringe package, therein prefilled with a desired medicament. A conveyor mechanism movable on a track around the periphery of the bins is stopped at the discharge end of a selected bin. Actuating bars open the conveyor mechanism and a gate on the outlet end of the selected bin to allow a single carrier to enter the conveyor. The conveyor then moves to labeling and ejector stations where the medicament container is labeled and removed from the carrier for delivery to a discharge outlet. The conveyor then returns the empty carrier to the inlet end of the bin from which it was retrieved. The dispenser is automatically controlled by an electronic control system.

10 Claims, 14 Drawing Figures

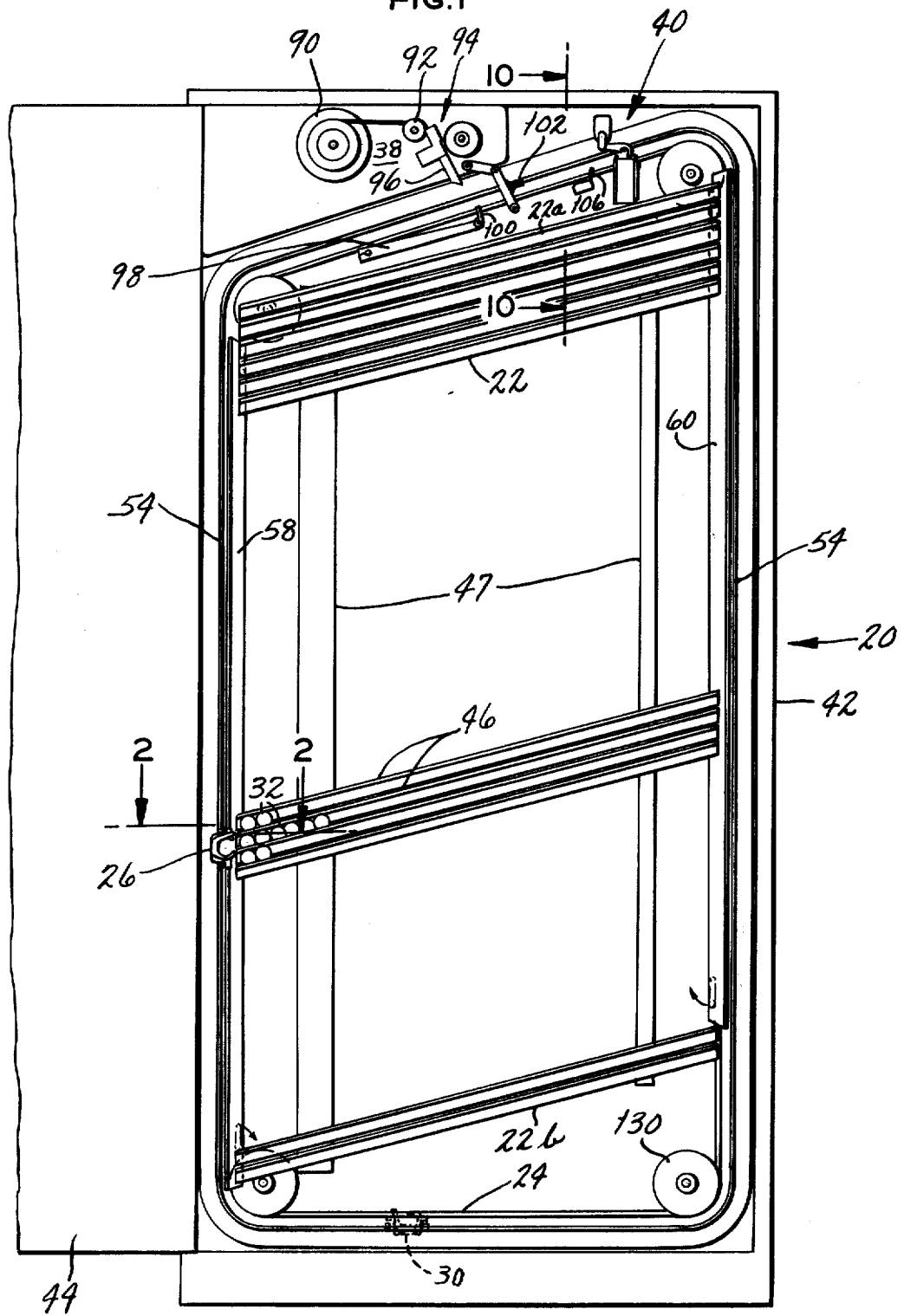

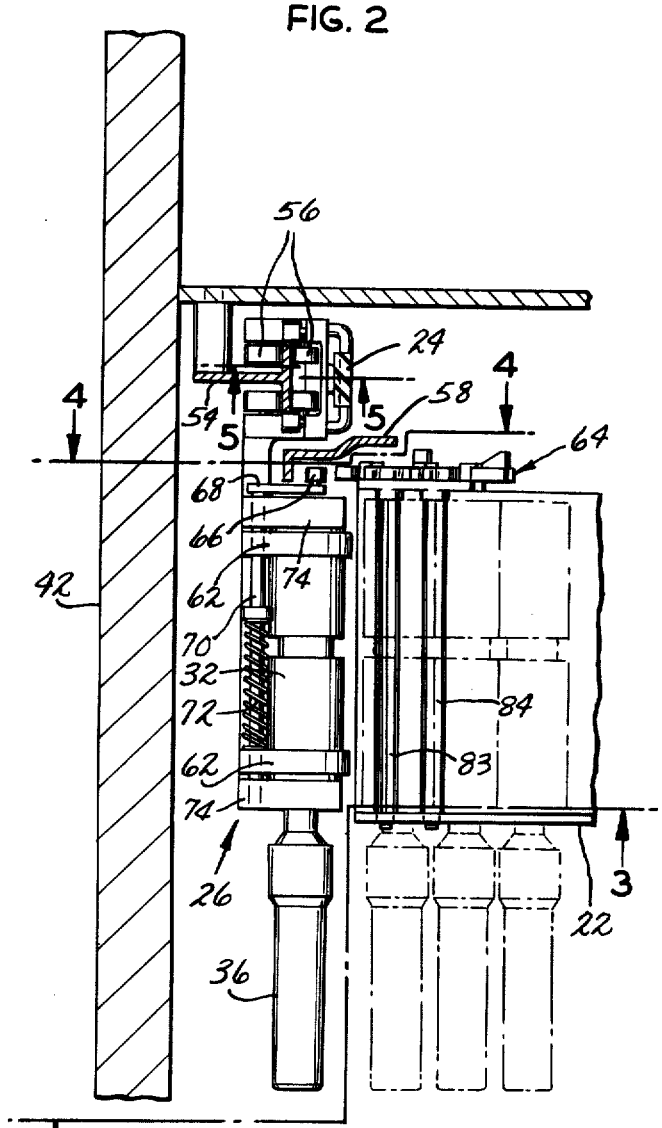
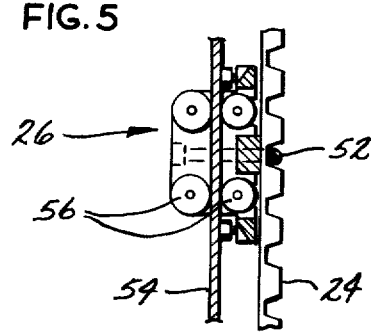
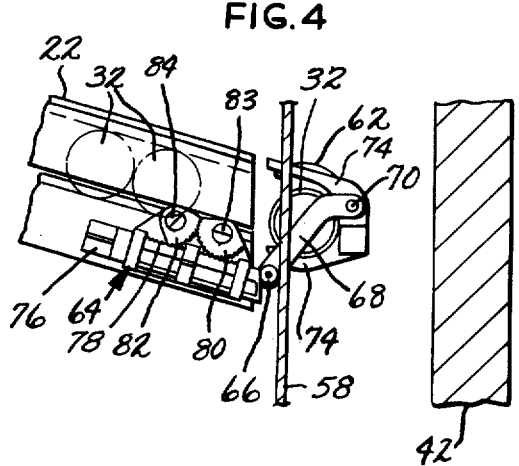
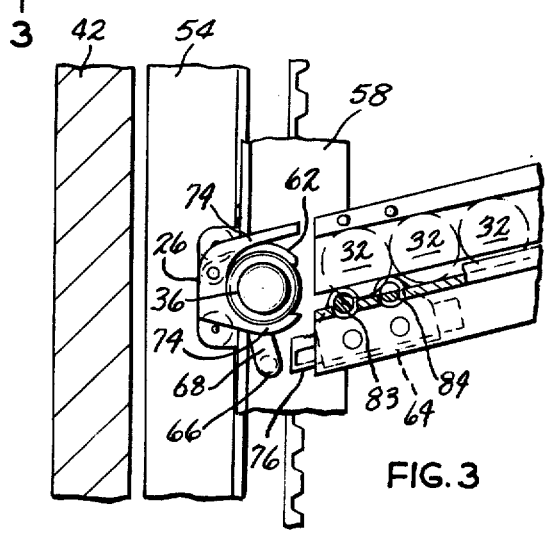
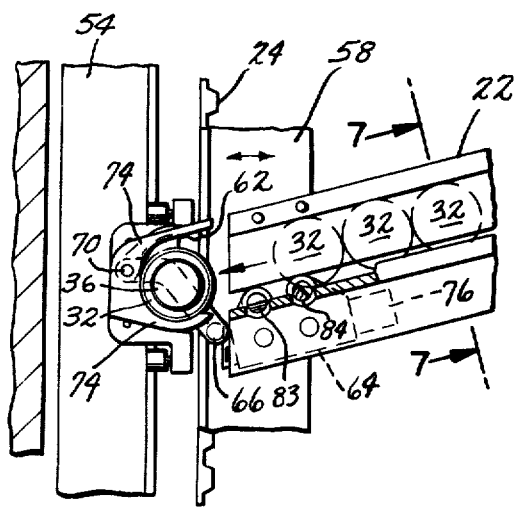

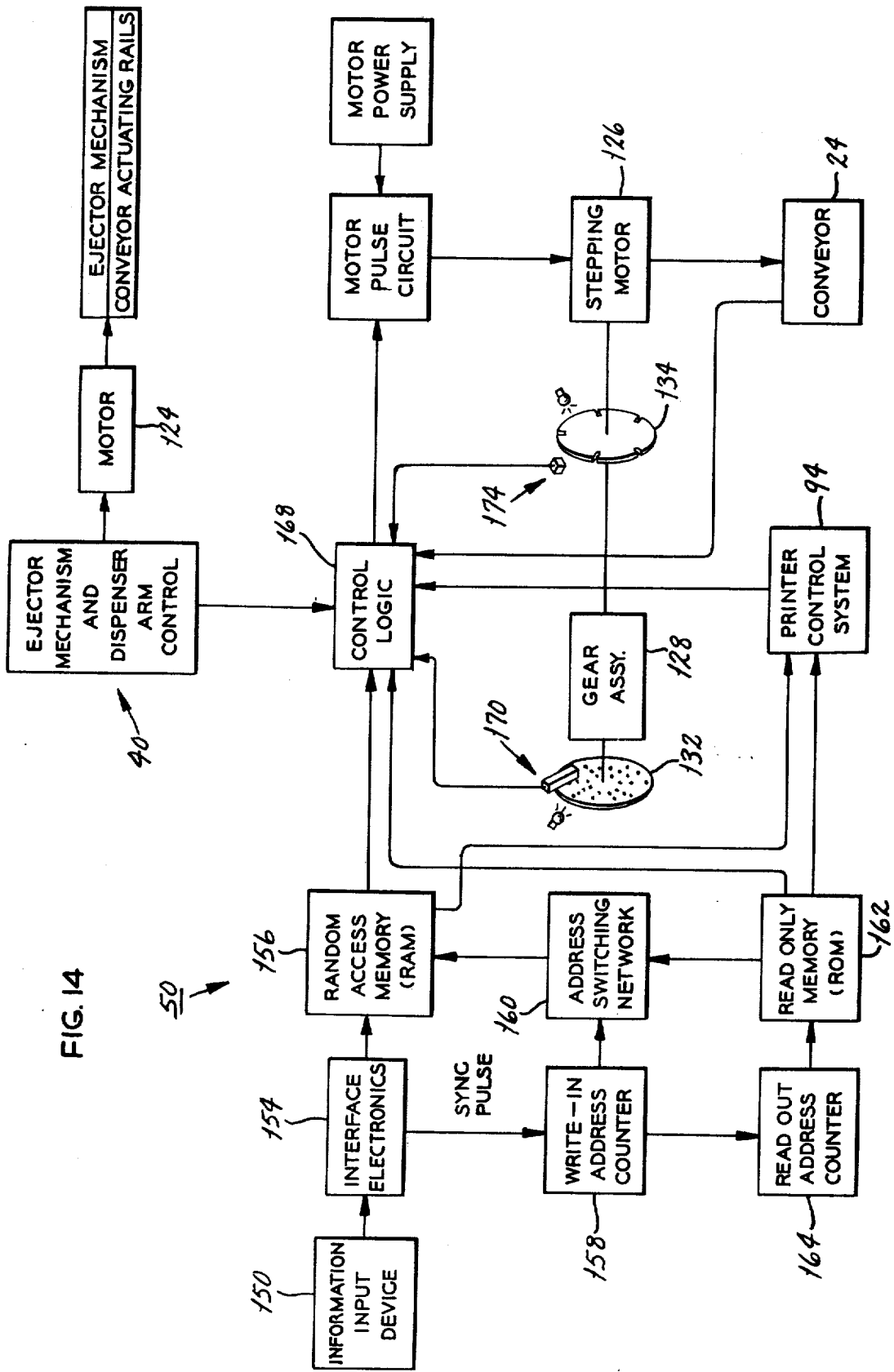

MEDICAMENT DISPENSER

BACKGROUND OF THE INVENTION

This invention relates to medicament dispensing systems, and more particularly to a dispensing medicament system which stores a plurality of different kinds of packaged medicaments which can be selectively retrieved and dispensed.

In brief, the dispensing of liquid medicaments in hospitals, such as injectables contained in hypodermic syringes, begins when a physician completes an order or prescription for administration of a particular medicament to a particular patient. In certain circumstances, this order may be filled at the nursing station on the floor where the patient is located or, in larger institutions, a central pharmacy may fill all prescriptions for delivery to the nursing stations on each floor. With either type of system utilized, the selection, filling and delivery of a particular medicament in a desired quantity to a particular patient involves plural steps or actions to be taken by different individuals, any of which may lead to error. Since the consequences of errors of this nature may obviously be serious, even fatal, attempts have been made to systematize the dispensing of medicaments so as to reduce or eliminate the possibility of error. In addition, the procedure described above is time consuming, therefore increasing the cost of medical care, and does not permit the efficient utilization of personnel which could be accomplished if the institution was able to fill all, or most, medicament containers in advance for dispensing on an as-needed basis.

SUMMARY OF THE INVENTION

Accordingly, it is a general object of the present invention to provide a medicament dispenser which can store a plurality of different medicaments prefilled in dispensing packages and wherein any selected one of the medicaments can be quickly and readily dispensed for administration.

Another object is to provide a dispenser of the above type wherein the dispenser is economical to manufacture, highly accurate in operation to reduce errors in dispensing medications, and which reduces the time between an order for a medicament and its delivery.

Still another object is to provide a dispenser of the above type which is particularly adapted for storing and dispensing liquid medicament containers, such as prefilled hypodermic syringes.

In accordance with one form of the present invention, a dispenser is provided with a plurality of bins each holding a plurality of different medicaments, each bin having discharge and inlet ends. Plural medicament container carriers are disposed in each bin, each carrier adapted to receive a medicament container. A conveyor is trained about the bins and means are provided on the conveyor for holding a carrier. Movement of the conveyor is controlled for stopping the holder at a selected one of the discharge ends of the bins for receiving a carrier and medicament container therefrom. Means are also provided for removing the medicament container from its carrier and for discharging it from the dispenser. The empty carrier may then be returned to the opposite end of the bin from which it was removed.

These as well as other objects and advantages of the present invention will become apparent from the following detailed description and accompanying drawings in which corresponding reference characters indicate corresponding parts throughout the several views.

BRIEF DESCRIPTION OF THE DRAWINGS

FIG. 1 is a front elevational view of a medicament dispenser in accordance with a preferred embodiment of the present invention;

FIG. 2 is a cross-sectional view taken along lines 2—2 of FIG. 1 but illustrating the conveyor holder mechanism in a closed position;

FIG. 3 is a view, partly in section, taken along lines 3—3 of FIG. 2;

FIG. 4 is a sectional view taken along lines 4—4 of FIG. 2 but illustrating the holder mechanism in an open position;

FIG. 5 is a sectional view taken along lines 5—5 of FIG. 2;

FIG. 6 is a view illustrating the opposite side of the mechanism shown in FIG. 4;

FIG. 14 is a schematic diagram of an electronic control circuit for controlling the present medicament dispenser.

DESCRIPTION OF THE PREFERRED EMBODIMENT

Figure 7:
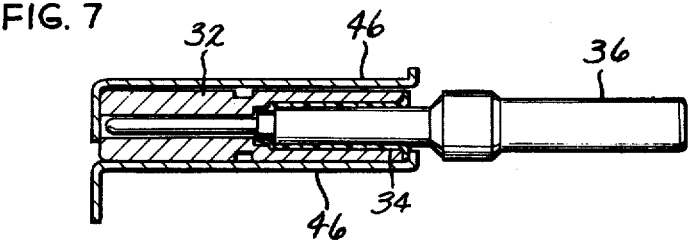
FIG. 7 is a sectional view taken along lines 7—7 of FIG. 6.

Referring now to the drawings, and particularly to FIG. 1, a medicament dispenser constructed in accordance with the present invention is generally indicated by 20. The dispenser 20, in brief, comprises a plurality of article-containing bins 22 carried with the dispenser in an inclined position with respect to the horizontal. While only several of the bins are shown in the drawing for clarity, it should be understood that the entire space between the uppermost bin illustrated at 22a and the lowermost bin illustrated at 22b will contain individual bins. Each of the bins 22 is adapted to contain a plurality of articles, to be hereinafter further described. Each bin, therefore, is capable of containing a different medicament, or a different dosage of similar medicaments, or the same medicament as each of the other bins, or any combination of the above. The contents of each of the individual bins will, of course, be determined by the usage rates of individual medicaments within the institution in which the dispenser is installed.

Surrounding the bins 22 is an endless conveyor mechanism 24 comprising a flexible belt or the like having a holder assembly 26 fixed thereto. A rigid rail 54 surrounds the conveyor 24 and provides a track for guidance of the holder 26, as will be described more fully hereafter, to stabilize the holder throughout its travel.

In brief, the holder 26 is operated to always come to rest at a "home" or starting position, as illustrated in phantom at 30. Upon actuation of the mechanism, for example by insertion of a suitably coded punched data card, or initiation of a prescription order read into the electronic control circuitry of the dispenser (FIG. 14) by a magnetic tape input device, the conveyor 24 is moved in a clockwise direction as illustrated in FIG. 1 carrying the holder 26 therewith. The control circuitry for the dispenser, on command of an input signal, causes the conveyor to stop with the holder 26 positioned adjacent the outlet or dispensing end of the selected bin 22, as illustrated in FIG. 1.

Figure 8:
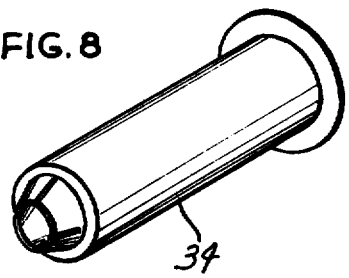
FIG. 8 is a perspective view of a sleeve or insert for use in the carrier of FIG. 7.

To permit uniform bin or hopper construction, a carrier 32, as illustrated in FIG. 7, is provided having a cylindrical external configuration for rolling engagement with the inclined interior surfaces of bin 22. Each of the carriers 32 is provided with an internal configuration, which may take the form of an insert 34 as illustrated in FIG. 8, for accepting the external configuration of a suitable medicament dispensing package, such as the syringe container 36 as illustrated in FIG. 7. Upon command, the syringe carrier 32 adjacent the conveyor holder 26 is deposited into the conveyor holder 26 and the conveyor again activated to move the holder, with the syringe carrier 32 and syringe 36 therein, along the path of the conveyor to a printing and label affixing station 38 where a label is printed and applied to the exterior of the syringe case 36 and thereafter to an ejecting and discharge station 40 where the syringe case 36 is removed from its carrier 32 and ejected onto a discharge chute for delivery outside the dispenser.

Upon discharge of the syringe case 36 from its carrier 32, the carrier 32, still retained by the conveyor holder 26, is moved along the path of the conveyor until it is in registry with the opposite, or inlet end of the bin from which it was removed. Thereupon, the conveyor holder 26 releases the empty syringe carrier 32 into the bin 22 from which it was originally selected. The conveyor, with the holder 26 thereon, then returns to the rest position 30 of the holder 26.

A suitable cabinet 42 is provided for enclosing the dispensing mechanism in a secure manner. The cabinet may, for example, include a door 44 which may be opened for loading the bins with prefilled medicament containers, or for performing any necessary maintenance on the dispensing mechanism, and thereafter locked in a closed position.

As best illustrated in FIGS. 1 and 7, each of the bins 22 is comprised of upper and lower channels 46 defining an open space therebetween. The bins 22 are rigidly carried within the dispenser by brackets 47 secured to the dispenser frame. The syringe carrier 32 has an external cylindrical surface configured for low friction rolling engagement with the interior surfaces of channels 46 of bins 22 so that each will roll under the influence of gravity from the upper raised inlet ends of the bin (on the right as illustrated in FIG. 1) to the lower dispensing ends of the bins (illustrated on the left in FIG. 1). As stated previously, the carriers 32 are provided so that any of a plurality of differently configured medicament dispensing packages 36 may be accommodated within the uniformly configured bins 22. While the carrier 32 may be provided with a plurality of different internal configurations for receiving a plurality of different externally configured medicament packages, it may be desirable, for example, where a variety of such packages are used, to use the insert 34 illustrated in FIG. 8. In this manner, the internal configuration of carrier 32 may be standardized to accept a standard external configuration for the insert 34 with the latter having an internal configuration corresponding to each of the different external configurations of the various medicament packages. For example, the insert 34 may be provided with a cylindrical interior configuration for receiving the cylindrical external configuration of the syringe barrel package 36. Similarly, the internal configuration of insert 34 may be such as to accommodate a medicament vial, or other dispensing package, without modification of the carrier 32 or bins 22.

Figure 12:
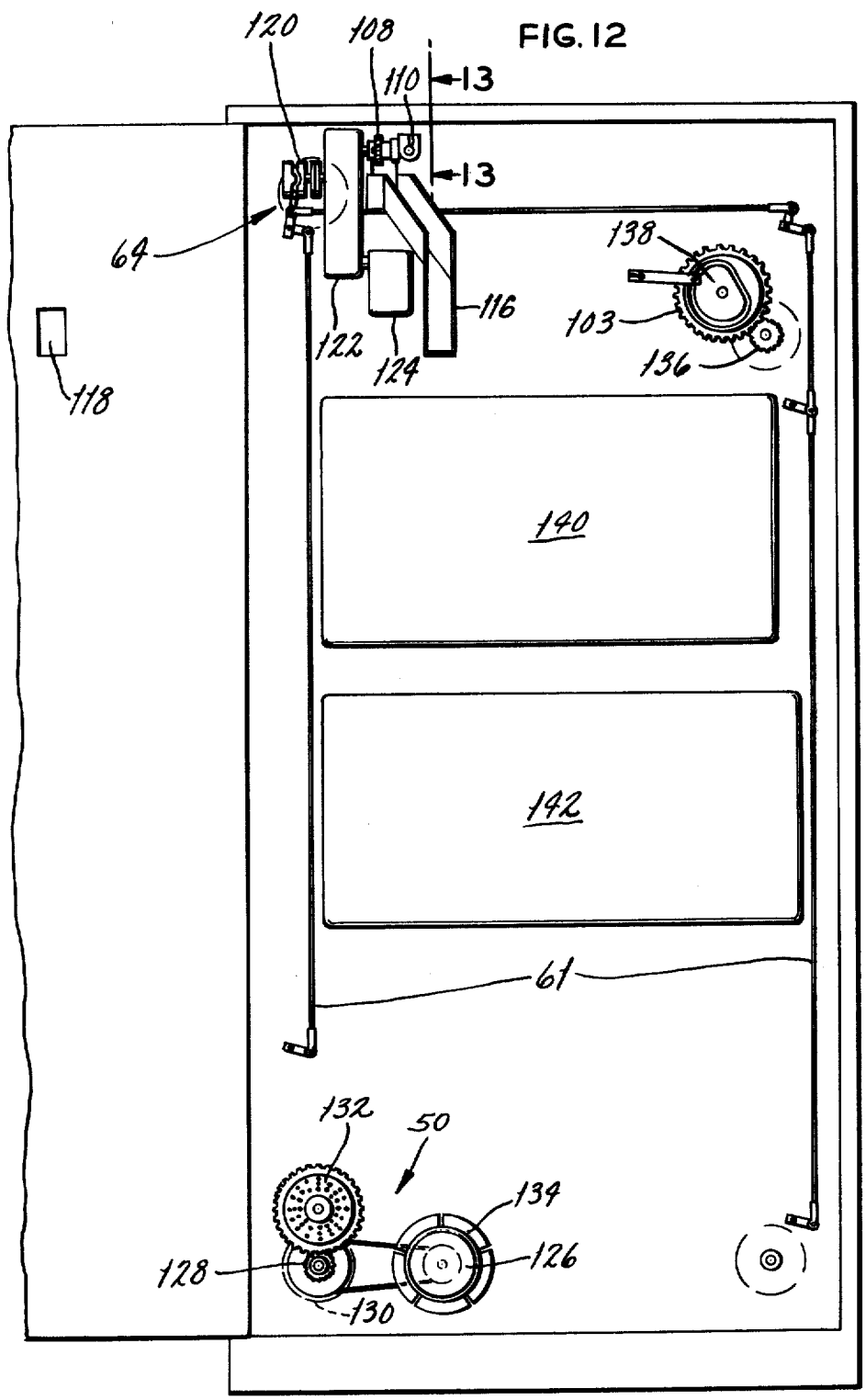
FIG. 12 is a rear elevational view of the dispenser of FIG. 1.

As illustrated in FIGS. 2–6, the conveyor 24 is comprised of an endless toothed belt which is driven by a suitable electric motor and control system illustrated at 50 in FIG. 12. As seen in FIG. 5, the conveyor holder assembly 26 is attached to the belt 24 by means of a clip 52 for movement therewith. Additionally, the mechanism is stabilized for movement along the open ends of the bins 22 by rails 54 engaged by a plurality of rollers 56. Spaced inwardly of the conveyor on either side of the dispenser are a pair of actuating rails 58 and 60. These rails are carried by a linkage assembly illustrated generally in FIG. 12 at 61 operated by motor driven control 64 for movement of the rails 58 and 60 inwardly toward each other and outwardly away from each other. The rail 58, as will be described more fully hereafter, operates arms 62 on the conveyor holder 26 for opening and closing the same (see FIGS. 3 and 6) and a gate release mechanism 64 on the dispensing end of each of the bins 22 for releasing the end carrier 32 and its medicament container 36 for receipt by the holder 26. Similarly, the rail 60 operates the arm 62 of holder 26 to release an empty carrier 32 into the opposite end of the bin from which it was dispensed.

More specifically, when the rail 58 is actuated from its outer position illustrated in FIG. 3 to its inner position illustrated in FIG. 6, a cam roller 66 carried on one end of a pivotal arm 68 is engaged to effect pivoting of the arm 68 that is connected to a shaft 70. Gripper arms 62 are fixed to shaft 70 so that rotation of shaft 70 causes the arms 62 to pivot from their closed FIG. 3 position to their open FIG. 6 position. A spring 72 is provided for biasing the shaft 70 and arms 62 in a closed direction. Therefore, movement of rail 58 initially causes the gripper arms 62 of mechanism 26 to open preparatory to receiving a carrier 32 and medicament package 36. As will also be noted in FIGS. 2, 3 and 6, a pair of stationary arms 74 are carried by the gripper mechanism 26 for stabilizing the carrier 32 during actuation of the movable gripper arms 62.

Continued inward movement of rail 58 forces cam roller 66 on arm 68 into engagement with a spring biased reciprocal plunger 76 carried by the bin gate mechanism 64. As shown in FIGS. 3, 4 and 6, the plunger 76 has a toothed upper surface 78 for engagement with a pair of sector gears 80 and 82. The gears 80 and 82 are respectively carried by shafts 83 and 84 which are semicircular in cross-sectional configuration. The shaft 83 on gear 80 is in open position when shaft 84 on gear 82 is in a closed position, and vice versa. That is, as illustrated in FIG. 3, the shaft 83 on gear 80 is shown in a closed position retaining the end carrier 32 from being dispensed from the bin 22 while the shaft 84 on sector gear 82 is in an open position to permit passage of the second carrier 32 in the bin 22 upon dispensing of the first carrier. However, in the FIG. 6 position where a carrier 32 is being dispensed into the conveyor holder assembly 26, the shaft 83 on sector gear 80 has been moved to an open position while the shaft 84 on sector gear 82 has been moved to a closed position to retain the second carrier 32 from also being dispensed. As mentioned above, rotation of shafts 83 and 84 and gears 80 and 82 is accomplished through reciprocation of the plunger 76 which is operated by movement of cam roller 66 into engagement with the end face of the plunger upon movement of rail 58.

As described above, the rail 58 is initially moved inwardly to open gripper arms 62 on the conveyor holder mechanism 26 and to rotate shaft 83 on gear 80 to permit dispensing of the endmost carrier 32 and medicament container 36 into the conveyor holder 26. The rail is thereafter moved outwardly by linkage mechanism 61 to its outward FIG. 3 position whereupon spring 72 closes arms 62 and retracts roller 66 away from the end face of plunger 76 to close and retain the carrier and medicament package within the holder 26 to permit return of the bin gate mechanism 64 to a position wherein the next carrier 32 moves past shaft 84 and is retained within the bin.

After the conveyor holder mechanism 26 is in its FIG. 3 position containing a carrier 32 and medicament package 36, the conveyor 24 is again actuated to move the holder through the printer and label applying station 38 and discharge station 40.

A label printer is shown in FIG. 1 to comprise a spool of label stock 90, which may, for example, have a pressure sensitive adhesive backing, which feeds through an idler roll 92 to a suitable printer 94, the latter being controlled by the electronic control circuitry to be described more fully hereinafter. After the label is printed at 94 with suitable indicia, such as patient's name, room number, and name and dosage of the medicament contained within the package 36, it is cut to length by a cutter mechanism within the printer (not shown) and fed through a chute 96. A pivotally mounted arm 98 is disposed beneath the path of travel of the conveyor, the arm 98 having label gripper fingers 100 at its end. Just prior to passage of the medicament container 36 on the conveyor, the arm 98 is pivoted upwardly such that the label extending from chute 96 is gripped by the fingers 100 and pulled downwardly into the path of the traveling medicament container 36. Thereafter, as the medicament container travels along the path of the conveyor, the label is wiped onto the surface of container 36 by a pair of flexible, spring-like wiper arms 102 to securely attach the label to the outside of package 36. A suitable mechanism 103 (FIG. 12) is provided for controlling the operation of the printer and label applying means.

Figure 10:
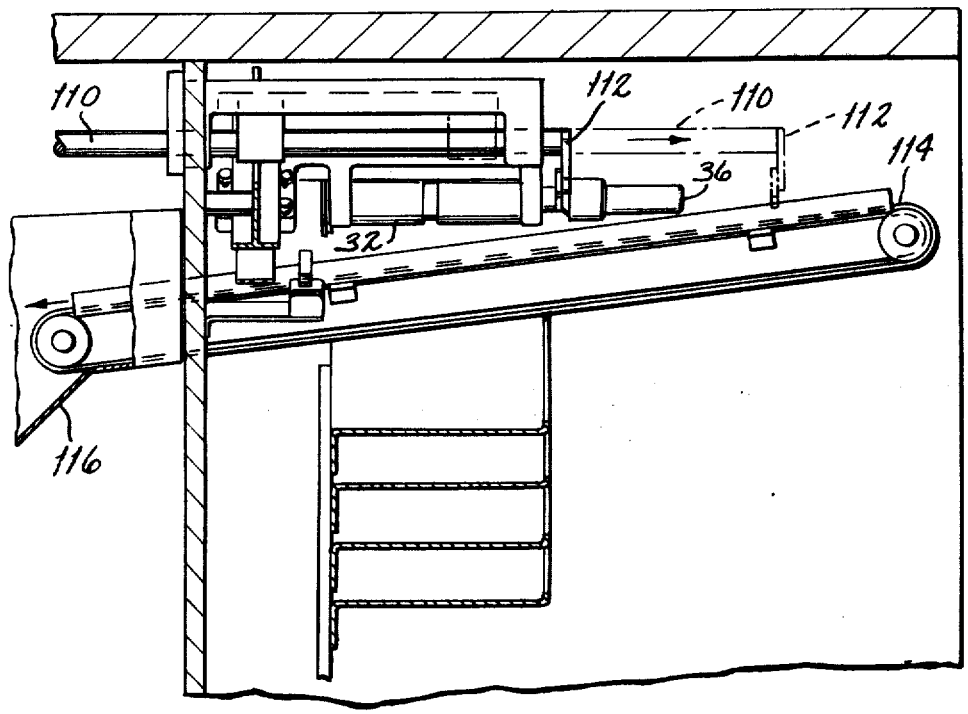
FIG. 10 is a sectional view taken along lines 10—10 of FIG. 1.
Figure 11:
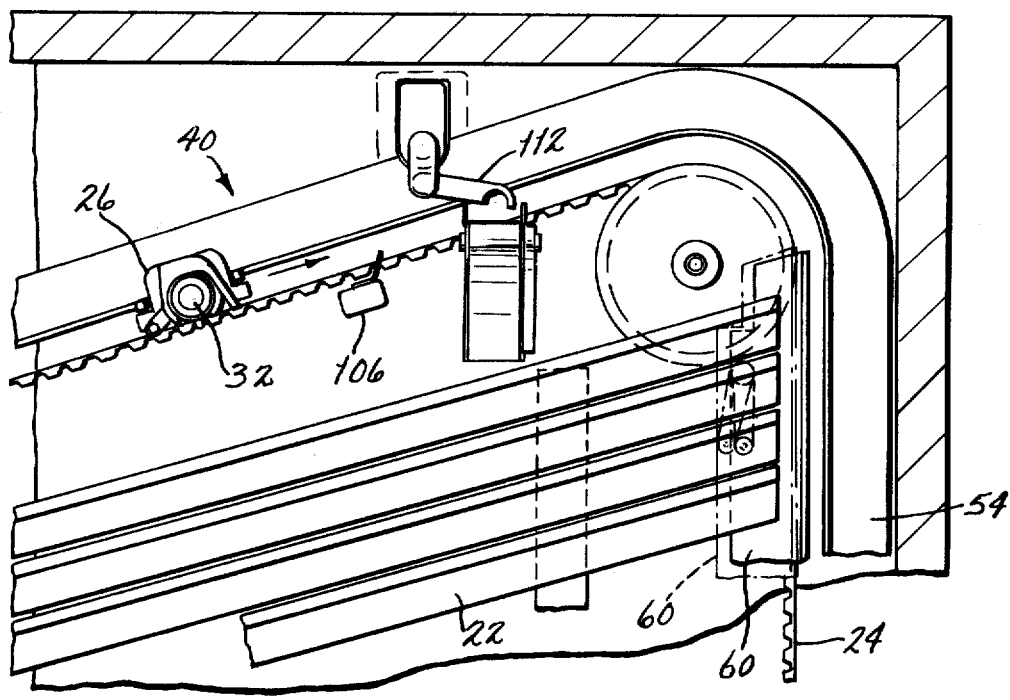
FIG. 11 is an enlarged view of a portion of the discharge mechanism shown in FIG. 1.
Figure 13:
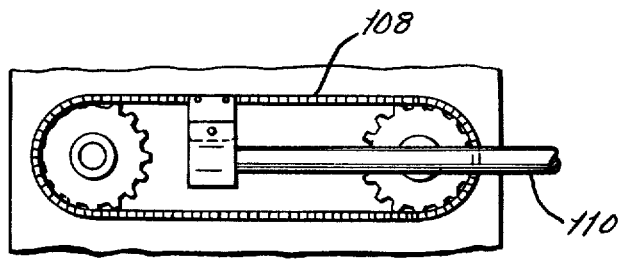
FIG. 13 is a sectional view taken along lines 13—13 of FIG. 12.

The labeled medicament package 36 is thereafter brought to the discharge station 40 where, as illustrated in FIGS. 10, 11 and 13, the medicament package 26 is ejected from carrier 32 onto a conveyor and slide mechanism for discharge from the dispenser. More specifically, when the holder 26 reaches discharge station 40, it actuates a microswitch 106 which stops the conveyor with the holder 26 in a proper position for removal of the package. The control system effects operation of a motor driven chain assembly 108 carrying a shaft 110. The free end of shaft 110 carries a dispensing arm 112 having a configuration suitable for grasping the medicament package and removing it from its carrier. Thus, as illustrated in FIG. 10, the dispensing arm 112 moves from its solid line position where it engages an external flange on package 36 to an extended dotted line position where it has completely extracted package 36 from carrier 32 and insert 34 thereby permitting the package 36 to drop onto a moving conveyor belt 114 for delivery to an exit chute 116 which, as illustrated in FIG. 12, aligns with an exit opening 118 in the rear cabinet door for dispensing the medicament package externally of the dispenser. After dropping the medicament package 36 on conveyor 114, continued movement of chain drive 108 retracts shaft 110 and arm 112 to its original position for the next dispensing cycle.

Figure 9:
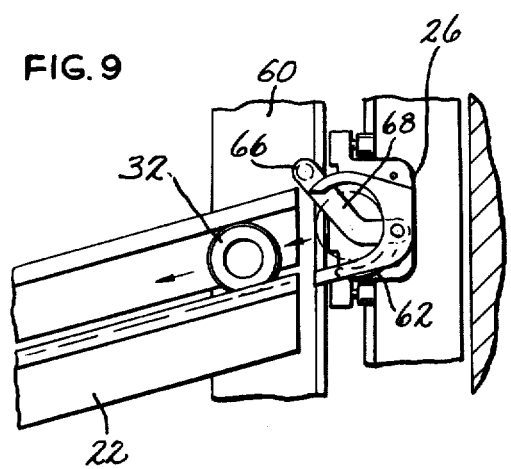
FIG. 9 is a fragmentary view illustrating the conveyor returning an empty carrier to the inlet end of a bin.

After discharge of the medicament package 36 from the dispenser, the empty carrier 32 and inset 34 remain with the conveyor holder mechanism 26 and are conveyed along the path of the conveyor until the holder 26 is in alignment with the inlet end of the bin from which the carrier 32 and medicament container 36 were removed. As best illustrated in FIG. 9, the rail 60 is then moved inwardly engaging cam roller 66 to thereby pivot arm 68 and gripper arms 62 to an open position for release of the carrier 32 into the open end of bin 22. Thus, as has been described, the empty carrier is returned to the same bin from which it was withdrawn so that each bin retains a full complement of carriers to again be loaded with suitable medicament containers.

After discharge of the empty carrier 32 into its proper bin, the conveyor is again activated to bring the conveyor holder 26 once again to its home or rest position indicated at 30 in FIG. 1.

In the rear view of the dispenser illustrated in FIG. 12, the linkage mechanism 61 for moving rails 58 and 60 inwardly and outwardly is controlled at 64 by a barrel cam 120 driven through a gear assembly 122 by an electric motor 124. The motor 124 also drives a sprocket around which chain 108 runs to drive the eject shaft 110 for removing the medicament package from its carrier.

As also shown in FIG. 12, the drive means 50 operating the conveyor 24 is shown to comprise an electric motor 126 driving a gear assembly 128 which drives a sprocket wheel 130 (FIG. 1) over which the conveyor belt passes. The gear assembly 128 also contains an encoded disc 132 with which a suitable optical system (FIG. 14) of conventional design may be used for controlling the movement of conveyor 24. To obtain exact registry of the holder mechanism 26 with the open end of the selected bin 22, a further disc 134 is provided which only permits the conveyor to stop when one of the slots in its periphery is properly positioned with respect to a suitable optical or electrical detection system (FIG. 14).

The drive mechanism 103 for operating the printer and label applying mechanism is also illustrated in FIG. 12 as comprising a gear assembly 136 driven by the conveyor 24 on the front side of the dispenser and a cam arrangement 138. FIG. 12 also depicts a suitable environmental control system, such as an air conditioning system 140 for maintaining the interior of the dispensing mechanism at the proper temperature, humidity, etc., necessary to preserve the integrity of the medicaments therein, and an electronic control system 142 for controlling the operation of the dispenser.

The electronic control system 142 illustrated in block diagrammatic form in FIG. 14 is shown to comprise an information input 150 which may include a punched card, coded tape, or CRT terminal providing a source of binary coded information. The coded information may represent the desired kind of medicament, that is, coded information corresponding to one of the bins 22 that has the desired medicament. The coded information may also include the information necessary to print the label such as the patient's name, room and kind of medicament. The printer 94 may be of any suitable or conventional type for printing labels in response to control signals. For example, the printer may be of the type having a rotary character wheel with an encoder wheel and photocell detector, and a set of electromagnetically controlled hammers.

Interface electronics device 154 is connected to the input device 150 to store input data in proper form into a random access memory 156. A write-in circuit for the random access memory includes a write-in address counter 158 which includes a clock and is connected to receive a sync pulse from the interface electronics for controlling the write-in cycle of the random access memory through an address switching network 160. In this system, a read only memory 162 is connected to address the random access memory 156. A read-out address counter 164 which may include a clock determines the read-out cycle. The counters 158 and 164 are connected by a cycle-complete line to transfer control at the end the wirte-in and write-out cycles. Information is stored in the random access memory during the write-in cycle and the read only memory addresses the random access memory during the read out cycle to extract stored coded information from the random access memory in a selected sequence as required by the various controls of the dispenser. Read only memory and random access memory output lines are connected to a control logic device 168 which controls the various functions of the dispensing system. The control logic 168 controls for example, the motor 124 which operates the ejector mechanism including arm 112 and belt 114, as well as the actuating rails 58 and 60 that control the opening and closing of the conveyor holder 26. The control logic is connected to a motor pulse circuit which is supplied from a power supply and controls the stepping motor 126 that drives the conveyor 26. The encoder disc 132 which is driven by the stepping motor has a radial series of holes, each series corresponding to a different one of the bins 22. A photodetector indicated generally at 170 provides a check or comparison signal to ensure that the conveyor holder 26 is at the bin designated by the input information before a medicament is discharged from the bin. The wheel 134 and photodetector 174 connected to the control logic insures that the stepping motor stops the conveyor holder so that it accurately registers with a bin for accepting a medicament package, as previously mentioned. The printer control system for printer 94 is also shown connected with the memories and logic circuit for proper operation.

Various control systems and circuits including semiautomatic or manula control systems are also possible.

It is to be understood that the foregoing description and accompanying drawings have been given only by way of illustration and example, and alterations and changes of the present disclosure, which will be readily apparent to one skilled in the art, are contemplated as within the scope of the present invention.

What is claimed is:

1. A medicament dispenser comprising a plurality of individual bins each adapted to hold a plurality of medicaments to be dispensed therefrom, each of said bins having discharge and inlet ends, a plurality of medicament container carriers disposed in each of said bins, each of said carriers adapted to receive a medicament container, a conveyor mechanism trained about said bins for movement past the discharge and inlet ends thereof, means on said conveyor for holding one of said carriers, means for controlling the movement of said conveyor for stopping the carrier holding means at a selected one of the discharge ends of said bins, means for transferring a medicament container carrier from the discharge end of said selected bin into said holder, and means for removing the medicament container from its carrier and for discharging it from said dispenser.

2. A dispenser as set forth in claim 1 wherein after discharge of said medicament container, said means for controlling the movement of said conveyor stops the carrier holder at the inlet end of the same bin from which the medicament container carrier was withdrawn, and means for transferring the empty carrier from said holder to said bin.

3. A dispenser as set forth in claim 2 further comprising a label printer and means for applying a lable to said medicament container before discharge from said dispenser.

4. A dispenser as set forth in claim 1 wherein said carriers are configured externally to conform to the configuration of said bins and are configured internally to conform to the configuration of one of a plurality of differently configured medicament containers.

5. A dispenser as set forth in claim 1 wherein said carriers are configured externally to conform to the configuration of said bins and are configured internally to receive an adapter, said adapter having an internal configuration conforming to the configuration of one of a plurality of differently configured medicament containers.

6. A dispenser as set forth in claim 2 wherein said conveyor is an endless driven belt and said holding means is carried by said belt.

7. A dispenser as set forth in claim 6 wherein said holder comprises movable arms for gripping and releasing said carrier.

8. A dispenser as set forth in claim 7 wherein each bin is provided with a movable gate at its discharge end for selectively releasing and retaining said carriers and medicament containers.

9. A method of dispensing a selected medicament from a dispenser containing a plurality of different medicaments, said dispenser having a plurality of bins each containing a plurality of carriers with a medicament container therein, and a movable holder for carrying said carrier, comprising the steps of providing an input signal to said dispenser indicative of the selected medicament, moving said holder to a position adjacent one end of a bin containing the selected medicament, transferring a carrier and medicament container from said selected bin to said holder, removing the medicament container from said carrier, discharging said medicament container from said dispenser, and returing said empty carrier to the opposite end of the same bin from which it was removed.

10. The method of claim 9 further including the steps of printing a label in the dispenser containing indicia thereon unique to the medicament selected, and applying said label to said medicament container prior to discharge.

* * * * *